United States Patent [19]

Matsuzaki et al.

[11] Patent Number: 5,639,809
[45] Date of Patent: Jun. 17, 1997

[54] AZO COMPOUNDS AND POLARIZING FILMS USING THE COMPOUNDS

[75] Inventors: Yoriaki Matsuzaki; Ryu Oi, both of Kanagawa-ken; Rihoko Imai, Tokyo; Keisuke Takuma, Kanagawa-ken; Hisato Itoh, Fukuoka-ken, all of Japan

[73] Assignee: Mitsui Toatsu Chemicals, Inc., Chiyoda, Japan

[21] Appl. No.: 490,152

[22] Filed: Jun. 14, 1995

[30] Foreign Application Priority Data

Jun. 22, 1994 [JP] Japan ................. 6-139844

[51] Int. Cl.$^6$ ............. F21V 9/14; G02B 5/30; C09B 45/28; C09B 45/32
[52] U.S. Cl. ............ 524/159; 524/94; 524/111; 524/190; 524/204
[58] Field of Search ............ 524/159, 94, 111, 524/190, 204

[56] References Cited

U.S. PATENT DOCUMENTS

| 2,769,805 | 11/1956 | Hanhart . | |
| 2,831,848 | 4/1958 | Riat et al. . | |
| 2,837,507 | 6/1958 | Riat et al. . | |
| 5,318,856 | 6/1994 | Misawa et al. | 428/524 |

FOREIGN PATENT DOCUMENTS

| 532917 | 4/1955 | Belgium . |
| 549342 | 6/1993 | European Pat. Off. . |
| 1068476 | 6/1954 | France . |
| 54-153648 | 12/1979 | Japan . |
| 59-145255 | 12/1984 | Japan . |
| 3068902 | 3/1991 | Japan . |
| 3089203 | 7/1991 | Japan . |
| 327284 | 3/1958 | Switzerland . |
| 719363 | 12/1954 | United Kingdom . |
| 781086 | 8/1957 | United Kingdom . |
| 2023301 | 12/1979 | United Kingdom . |

OTHER PUBLICATIONS

Chemical Abstracts, vol. 102, 26357w, "Water–Soluble Disazo Compounds", Aug. 20, 1984—Japanese Laid–Open Patent No. 59–145255. (Abstract Only).

Chemical Abstracts, vol. 104, 70283j "Water–Soluble Disazo Compounds", Aug. 16, 1985—Japanese Laid–Open Patent No. 60–156759. (Abstract Only).

Chemical Abstracts, vol. 104, 69953w, "Colored Poly(Vinyl Alcohol) Films", Sep. 2, 1985—Japanese Laid Open Patent No. 60–168743. (Abstract Only).

Chemical Abstracts, vol. 1115, 266442g, "Dichroic Dye Polarizer Film", Mar. 25, 1991, Japanese Laid Open Patent No. 68902. (Abstract Only).

Chemical Abstracts, vol. 116, 224369d, "Dyed Polarizer Film", Apr. 15, 1991, Japanese Laid Open Patent No. 89203. (Abstract Only).

*Primary Examiner*—Joseph L. Schofer
*Assistant Examiner*—Wu C. Cheng
*Attorney, Agent, or Firm*—Burns, Doane, Swecker & Mathis

[57] ABSTRACT

The present invention provides a polarizing film having high heat resistance and a high degree of polarization and excellent optical properties by dyeing a polymer film with a novel azo compound represented by the following formula (1) or (2):

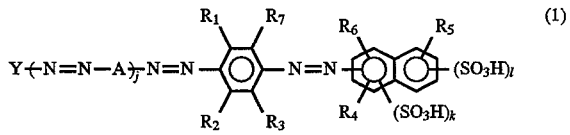

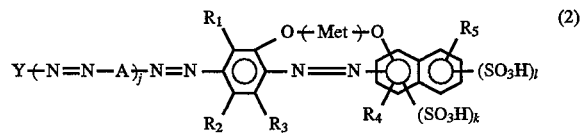

8 Claims, No Drawings

AZO COMPOUNDS AND POLARIZING FILMS USING THE COMPOUNDS

BACKGROUND OF THE INVENTION

1. Field of the Invention

This invention relates to novel azo compounds, metal complex compounds thereof, water-soluble azo dyes containing the azo compounds or metal complex compounds, and polarizing films having a high degree of polarization, said polarizing films each containing as a dichroic dyestuff one of the dyes in an oriented state in a polymer film.

2. Description of the Related Art

It is now the common practice to produce a polarizing film by impregnating a stretched and oriented film of polyvinyl alcohol or a derivative thereof or an oriented film of a polyene with iodine or a dichroic dye as a polarizing element to dye the former with the latter.

Among such polarizing films, those making use of iodine as a polarizing element are excellent in initial polarizing ability but are weak against water or heat. They are hence accompanied by a problem in durability when employed over a long period of time under high temperature and humidity conditions. To improve their durability, it has been proposed, for example, to intensify their treatment in an aqueous solution containing formaldehyde or boric acid or to use, as a protective film, a polymer film having low moisture permeability. Their durability is however still insufficient under high temperature and moisture conditions.

Polarizing films making use of a dichroic dye as a polarizing element, compared with polarizing films using iodine, have better resistance against water and heat but inferior in polarizing ability. With a view toward improving this drawback, polarizing films using an organic dye as a polarizing element and improved in heat resistance are proposed in Japanese Patent Laid-Open Nos. 153648/1979, 145255/1984, 156759/1985, 168743/1985, 68902/1991 and 89203/1991, but they are not fully satisfactory in polarizing performance.

There is hence a strong demand for the development of dye-base polarizing films which are superior in polarizing performance to iodine-base polarizing films.

SUMMARY OF THE INVENTION

An object of the present invention is to provide a water-soluble azo compound suitable for use in a polarizing film made of a polymer film as a base material, and also to provide a high-performance polarizing film containing the compound in an oriented state and therefore having excellent polarizing performance and heat resistance.

The present inventors have conducted extensive research with a view toward obtaining a polarizing film which uses a water-soluble azo compound as a polarizing element and is excellent in both polarizing performance and hydrothermo resistance, resulting in a completion of the present invention.

The present invention therefore provides:

1) an azo compound represented by the following formula (1) or (2):

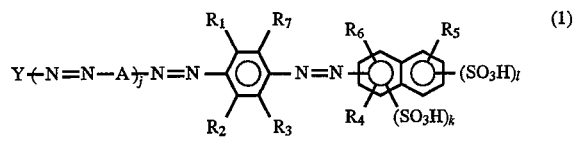

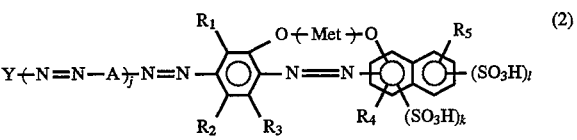

wherein Y represents a group represented by the following formula (1a) or (1b):

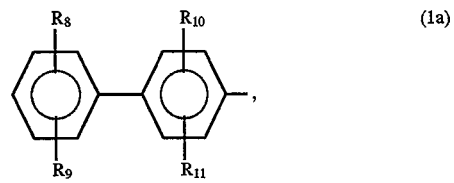

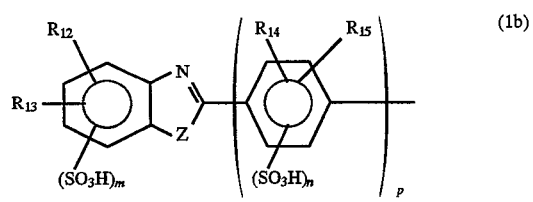

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxyl group, an ethoxyl group or a hydroxyl group, Z represents an oxygen atom, a sulfur atom or —NH— group, m stands for 0, 1 or 2, n stands for 0, 1 or 2, and p stands for 0, 1 or 2;

$R_1$ and $R_7$ each independently represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus may be substituted by one or more nitro, amino, hydroxyl, methyl, ethyl, carboxyl and/or sulfonic acid groups and/or chlorine atoms; $R_6$ represents a hydroxyl or amino group substituted at the o- or p-position relative to the azo group; j stands for 0 or 1, k stands for 0 or 1, l stands for 0, 1 or 2; A represents a connecting group represented by the following formula (1c) or (1d):

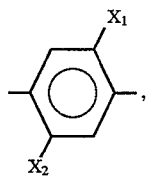

(1c)

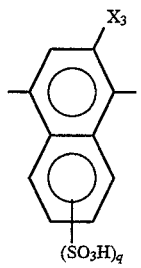

(1d)

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1;

Met represents a copper, nickel, zinc or iron atom.

2) A water-soluble dye comprising the azo compound described above under 1).

3) A polarizing film comprising a polymer film and the azo compound described above under 1), said azo compound being distributed in an oriented state in the polymer film.

4) A polarizing film obtained by dyeing a polymer film with the water-soluble dye described under 2) and then stretching the dyed film at a draw ratio of 2 to 9 times, and a production process thereof.

5) The polarizing film as described above under 4), wherein the polymer film is made of at least one material selected from the group consisting of polyvinyl alcohol, polyvinyl formal, polyvinyl acetal, polyvinyl butyral, those obtained by modifying polyvinyl alcohol, polyvinyl formal, polyvinyl acetal and polyvinyl butyral with ethylene, propylene, acrylic acid, maleic acid or acrylamide, and a cellulose resin.

The polarizing film, which has been obtained using the water-soluble dye containing the novel azo compound of the present invention, has high heat stability and a high degree of polarization and therefore shows optical properties comparable with conventional iodine-base polarizing films. This invention, therefore, has brought about marked valuable advantages from the industrial viewpoint.

DETAILED DESCRIPTION OF THE PREFERRED EMBODIMENTS

The present invention will hereinafter described in detail.

In the present invention, examples of the halogen atom include fluorine, chlorine and iodine atoms. Illustrative of the alkylcarbonylamino group include methylcarbonylamino and ethylcarbonylamino.

The azo compounds of the present invention represented by the formula (1) or (2) are each used in the form of the sodium salt in general. They can also be used each in the form of the free acid or even the potassium, lithium, ammonium, alkylamine or ethanolamine salt.

Each azo compound of the present invention represented by formula (1) can be prepared in a manner known per se in the art. For instance, it can be prepared by conducting general diazotization and coupling in repetition in accordance with the process described in Yutaka Hosoda, "Riron Seizo Senryo Kagaku (Dye Chemistry-Theory and Production)", 602–618, GIHODO K. K., (Oct. 1, 1963).

For example, when j stands for 0 in the formula (1), a compound represented by the following formula (3a) or (3b):

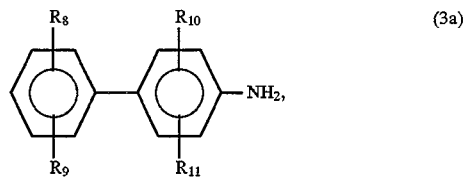

(3a)

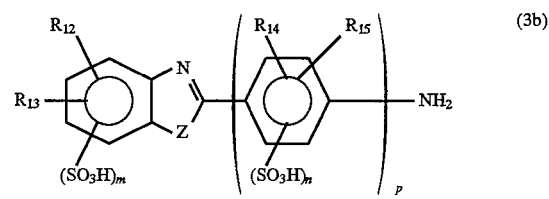

(3b)

wherein $R_{8-15}$, Z, m, n and p have the same meanings as defined above in the formula (1), is diazotized by using sodium nitrite in a mineral acid at 0°–30° C., followed by the coupling at 0°–30° C. and pH 3–5 with an aniline represented by the following formula (4):

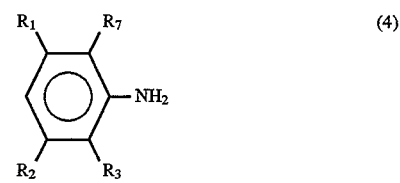

(4)

wherein $R_{1-3}$ and $R_7$ have the same meanings as defined above in the formula (1), whereby a monoazo compound represented by the following formula (5a) or (5b):

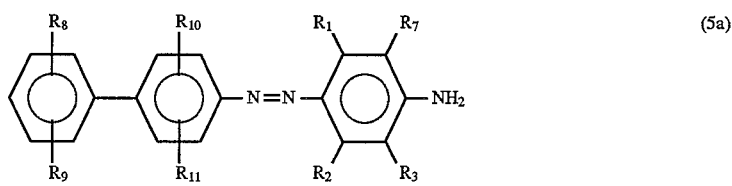

(5a)

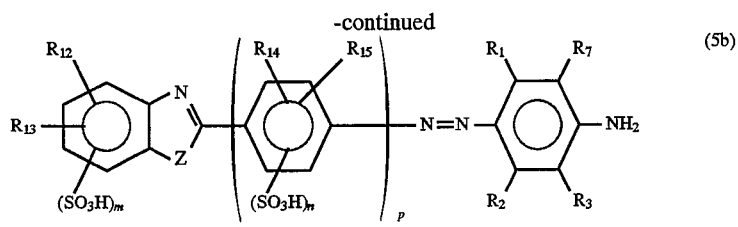
(5b)

wherein $R_{1-3}$, $R_{7-15}$, Z, m, n and p have the same meanings as defined above in the formula (1), can be obtained. Described specifically, the compounds (3a) and (3b) can be obtained, for example, by the processes described in Theodorus A. Kortekaas et. al., "J. Chem. Soc., Perkin II", 445 (1978) and "Riron Seizo Senryo Kagaku" 514–515 referred to above, respectively.

After the monoazo compound represented by the formula (5a) or (5b) is diazotized further in a manner known per se in the art, for instance, using sodium nitrite in a mineral acid at 0°–30° C., the diazotized compound is coupled at 0°–30° C. and pH 5–10 with a naphthalene represented by the following formula (6):

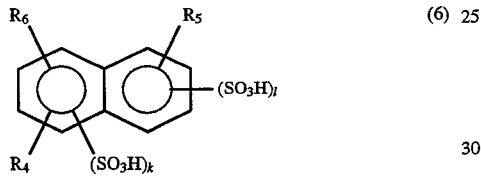
(6)

wherein $R_{4-6}$, k and l have the same meanings as defined above in the formula (1), whereby an azo compound represented by the following formula (7a) or (7b), that is, the formula (1) wherein j stands for 0:

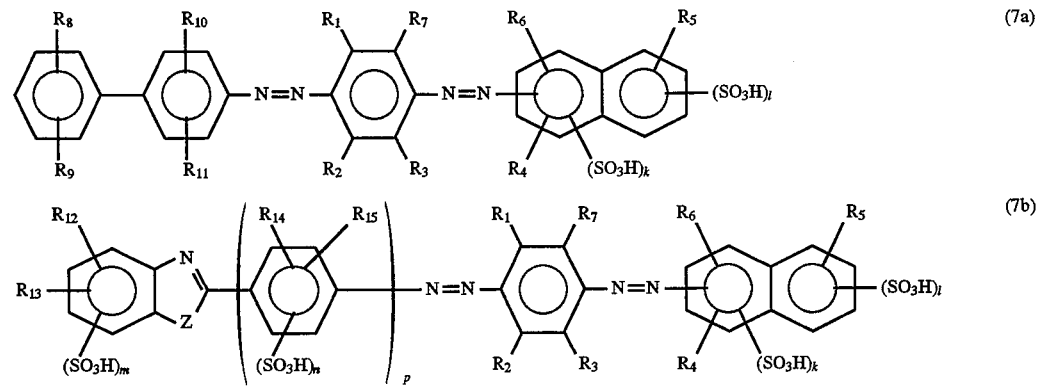
(7a)

(7b)

wherein $R_{1-15}$, Z, k, t, m, n and p have the same meanings as defined above in the formula (1) can be obtained. Needless to say, the azo compounds according to the present invention can be prepared through production routes other than the above-described one.

When J stands for 1 in the formula (1), on the other hand, a compound represented by the formula (3a) or (3b) is diazotized using sodium nitrite in a mineral acid at 0°–30° C., followed by the coupling with a compound represented by the following formula (8) or (9):

(8)

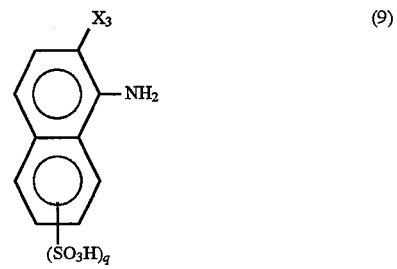
(9)

wherein $X_{1-3}$ and q have the same meanings as defined above in the formula (1), whereby a monoazo compound represented by the following formula (10a) or (10b):

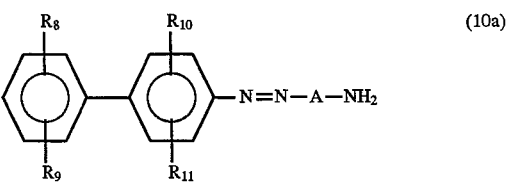
(10a)

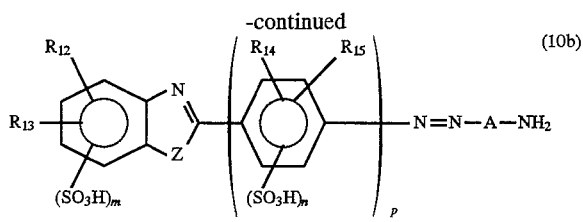

wherein $R_{8-15}$, Z, A, m, n and p have the same meanings as defined above can be obtained.

After the monoazo compound (10a) or (10b) so obtained is diazotized further in a manner known per se in the art, for instance, by using sodium nitrite in a mineral acid at 0°–30° C., the diazotized compound is coupled at 0°–30° C. and pH 3–5 with an aniline represented by the formula (4), whereby a disazo compound represented by the following formula (11a) or (11b):

compounds of the present invention can also be prepared through production routes other than the above-described one.

The azo compound of the present invention represented by the formula (2) can be prepared, for example, in accordance with the process described in Yutaka Hosoda, "Riron Seizo Senryo Kagaku (Dye Chemistry-Theory and Production)", 627–631, GIHODO K. K., (Oct. 1, 1963). Namely, an azo compound represented by the following formula (13a) or (13b):

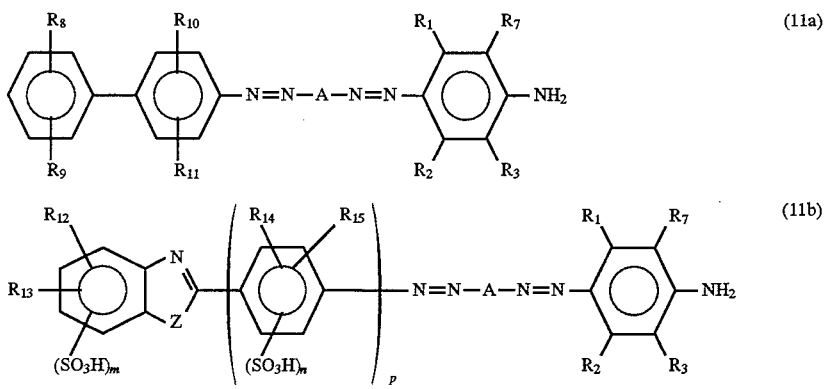

wherein $R_{1-3}$, $R_{7-15}$, Z, A, m, n and p have the same meanings as defined above in the formula (1) can be obtained.

The disazo compound (11a) or (11b) so obtained is diazotized further in a manner known per se in the art, for instance, by using sodium nitrite in a mineral acid at 0°–30° C., followed by the coupling at 0°–30° C. and pH 5–10 with a naphthalene represented by the formula (6), whereby an azo compound represented by the following formula (12a) or (12b), that is, the formula (1) wherein j stands for 1:

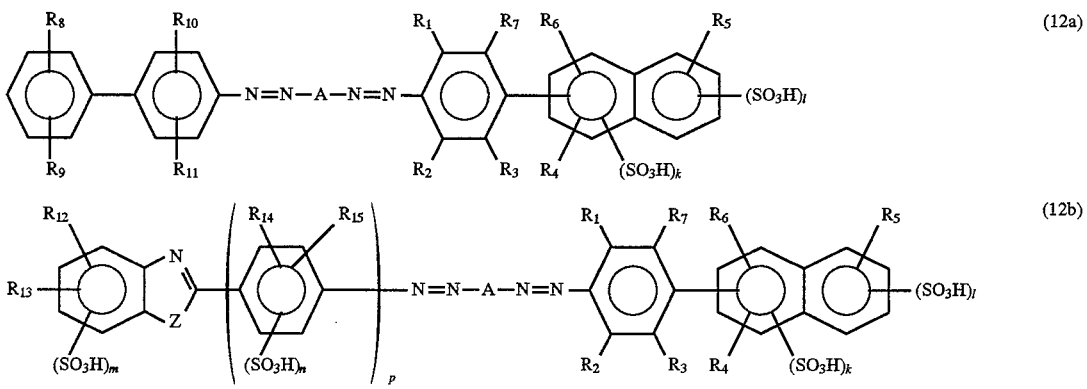

wherein $R_{1-15}$, A, Z, k, l, m, n and p have the same meanings as defined above in the formula (1) can be obtained. The azo

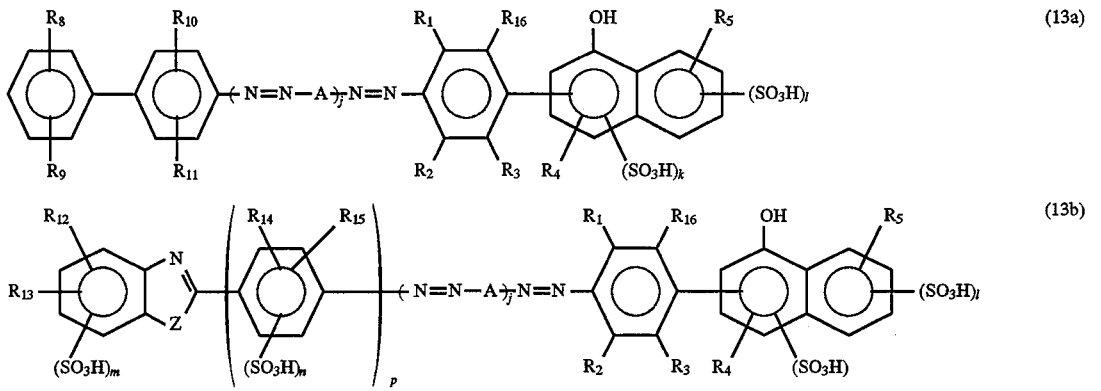

(13a)

(13b)

wherein $R_{1-5}$, $R_{8-15}$, A, j, k and l have the same meanings as defined in the formula (2) and $R_{16}$ represents a hydroxyl or methoxyl group, is dissolved or dispersed in water and/or a hydrophilic solvent, for example, in a mixed solvent of ethylene glycol or ethyl cellosolve and water, and an aqueous solution of copper sulfate, copper chloride, tetraammine copper, copper acetate, nickel sulfate, nickel chloride, nickel acetate, zinc sulfate, zinc chloride, iron sulfate, iron chloride or the like is then caused to act, at 50°–100°0 C., preferably at 80° C. or higher under alkaline conditions, preferably in the presence of ammonia, monoethanolamine or diethanolamine, on the resultant solution or dispersion, whereby the target transition-metal-containing azo compound represented by the formula (2) can be obtained.

Specific examples of the biphenyl compound represented by the formula (3a) include 4'-amino-4-biphenylcarboxylic acid, 4'-amino-3'-chloro-4-biphenylcarboxylic acid, 4'-amino-3'-methoxy-4-biphenylcarboxylic acid, 4'-amino-4-biphenylsulfonic acid and 4'-amino-3',4-biphenyldisulfonic acid.

Specific examples of the compound usable in the present invention and represented by the formula (3b) include 2-(p-aminophenyl)-6-methylbenzothiazole, 2-(p-aminophenyl)-6-methylbenzothiazole-5-sulfonic acid, 2-(p-aminophenyl)-6-methylbenzothiazole-7-sulfonic acid, 6-carboxy-2-(p-aminophenyl)benzothiazole-7-sulfonic acid, 2-(4'-amino-3'-sulfophenyl)-6-methylbenzothiazole-7-sulfonic acid, 2-aminobenzothiazole, 2-(p-aminophenyl)-5-methylbenzoxazole, 2-(p-aminophenyl)-5-methylbenzoxazole-4-sulfonic acid, 2-(4'-amino-3'-sulfophenyl)-5-methylbenzoxazole-4-sulfonic acid, 2-(4'-aminobiphenyl)benzothiazole, 2-(4-aminophenyl)benzoxazole, 2-(4'-aminobiphenyl)benzoxazole, 2-(4-aminophenyl)benzoimidazole and 2-(4'-aminobiphenyl) benzoimidazole and derivatives thereof.

Specific examples of the aniline represented by formula (4) or (8) include p-cresidine, 2,5-dimethoxyaniline, 2,5-diethoxyaniline, o-anisidine, m-acetylamino-o-anisidine, 5-acetylamino-2-methoxyaniline, 5-acetylamino-2-ethoxyaniline, o-toluidine, m-toluidine, p-xylidine, m-anisidine, m-acetylamin-o-aniline, m-acetylamino-o-anisidine and aniline.

Specific examples of the naphthalene represented by formula (9) include 2-ethoxy-1-naphthylamine-6-sulfonic acid, 2-methoxy-1-naphthylamine-6-sulfonic acid, 2-ethoxy-1-naphthylamine, 1-naphthylamine, 2-methoxy-1-naphthylamine, 1-naphthylamine-6-sulfonic acid and 1-naphthylamine-7-sulfonic acid.

Specific examples of the naphthalene represented by the formula (6) include 1-hydroxy-6-aminonaphthalene-3-sulfonic acid (hereinafter abbreviated as "J acid"), N-phenyl J acid, N-(p-methylphenyl) J acid, N-methyl J acid, N-acetyl J acid, N-methyl-N-acetyl J acid, N-benzoyl J acid, N-(3- or 4-carboxyphenyl) J acid, N-(3- or 4-sulfophenyl) J acid, N-(4-amino-3-sulfophenyl) J acid, N-(4-hydroxy-3-carboxyphenyl) J acid, N-(4-aminobenzoyl) J acid, N-(4-amino-3-sulfobenzoyl) J acid, N-(4-hydroxy-3-carboxybenzoyl) J acid, N-(4-nitrophenyl) J acid, N-(4-nitrobenzoyl) J acid, N-(4-amino-3-methylbenzoyl) J acid, N-(3- or 4-carboxybenzoyl) J acid, N-(3- or 4-sulfobenzoyl) J acid, N-(β-hydroxyethyl) J acid, 1-hydroxy-7-aminonaphthalene-3-sulfonic acid (hereinafter abbreviated as "γ acid"), N-phenyl γ acid, N-methyl γ acid, N-acetyl γ acid, N-methyl-N-acetyl γ acid, N-benzoyl γ acid, N-(3- or 4-carboxyphenyl) γ acid, N-(3- or 4-sulfophenyl) γ acid, N-(4-amino-3-sulfophenyl) γ acid, N-(4-hydroxy-3-carboxyphenyl) γ acid, N-(4-aminobenzoyl) γ acid, N-(4-amino-3-sulfobenzoyl) γ acid, N-(4-hydroxy-3-carboxybenzoyl) γ acid, N-(4-nitrophenyl) γ acid, N-(4-nitrobenzoyl) γ acid, N-(4-amino-3-methylbenzoyl) γ acid, N-(3- or 4-carboxybenzoyl) γ acid, N-(3- or 4-sulfobenzoyl) γ acid, N-(β-hydroxyethyl) γ acid, 1-hydroxy-8-aminonaphthalene-3,6-disulfonic acid (hereinafter abbreviated as "H acid"), N-acetyl H acid, N-benzoyl H acid, N-(p-toluenesulfonyl) H acid, N-(benzenesulfonyl) H acid, N-(p-chlorobenzoyl) H acid, 1-hydroxy-8-aminonaphthalene-3,5-disulfonic acid (hereinafter abbreviated as "K acid"), N-acetyl K acid, 1-hydroxy-8-aminonaphthalene-5,7-disulfonic acid, 1-hydroxy-7-aminonaphthalene-3,6-disulfonic acid and 1-naphthol-3,6-disulfonic acid.

As the polymer film employed in the polarizing film of this invention, a hydrophilic polymer film is preferred. Specific examples of its material include polymers such as polyvinyl alcohol, polyvinyl formal, polyvinyl acetal and polyvinyl butyral; those obtained by modifying them with ethylene, propylene, acrylic acid, acrylamide maleate or the like; and cellulose resins. These polymers are particularly useful in that they have high solubility in water or a hydrophilic organic solvent, good compatibility with the compounds of the present invention and excellent film-forming property and, when stretch-oriented subsequent to formation into films, facilitate orientation of the compounds of the present invention.

As a process for producing the polarizing film of this invention by using the above-described polymer and the compound of this invention, (1) the polymer is formed into a film, the film is stretched and the stretched film is then dyed with the compound of the present invention, (2) the polymer is formed into a film, the film is dyed with the compound of the present invention and the dyed film is then strethced, (3) the compound of the present invention is added to a solution of the polymer to dye the polymer solution, followed by the formation of the dyed polymer solution into a film and stretching the film, or the like.

The above production of a dyed film described under (3) can be conducted generally in the following manner. Namely, a polymer is dissolved in water and/or a hydrophilic organic solvent such as an alcohol, glycerin or dimethylformamide, to which the compound according to the present invention is added to dye the polymer solution. The polymer solution so dyed is formed into a film by solution casting, solution coating, extrusion or the like, whereby a dyed film is produced. The concentration of the polymer dissolved in the solvent varies depending on the type of the polymer but may be 5–30 wt. %, preferably 10–20 wt. %. The concentration of the compound according to the present invention dissolved in the solvent also varies depending on the type of the polymer, the type of the dye, the thickness of the resulting film, performance of the film required upon employment as a polarizing film, etc., but may generally be 0.1–5 wt. % with about 0.8–2.5 wt. % being preferred.

On the other hand, the dyeing process described under (1) and (2) can be conducted generally in the following manner. Namely, a polymer film is immersed at 20°–80° C., preferably 30°–50° C. for 1–60 minutes, preferably 3–20 minutes in a dye bath containing the compound according to this invention and, if necessary, inorganic salts such as sodium chloride and sodium sulfate, and dyeing assistants such as surface-active agents, the concentration of said dye being 0.1–5 wt. %, preferably 0.8–2.5 wt. % based on the polymer film to be dyed, to dye the polymer film, followed by drying.

Illustrative stretching methods employed in (1), (2) and (3) include wet draw stretching, dry draw stretching, dry inter-roll compression stretching, etc. The stretching can be conducted by any of such methods. Although it is preferred to conduct this stretching at a draw ratio in a range of from 2 times to 9 times, a range of from 2.5 times to 6 times is preferred when polyvinyl alcohol or a derivative thereof is used.

After the stretching and orientation, boric acid treatment is applied in order to improve the waterproofness and polarizing performance of the stretched film. By this boric acid treatment, both the light transmittance and the degree of polarization of the film are improved. Regarding conditions for the boric acid treatment, the boric acid concentration is generally 1–15 wt. %, preferably 3–10 wt. % and the treatment temperature may desirably be in a range of 30°–80° C., preferably 40°–80° C. The treatment cannot bring about sufficient effects when the concentration of boric acid is lower than 1 wt. % or the temperature is lower than 30° C. When the concentration of boric acid is higher than 15 wt. % or the temperature exceeds 80° C., however, the resulting polarizing film will be brittle. Boric acid concentrations and treatment temperatures outside their respective ranges described above are therefore not preferred.

The azo compounds represented by formula (1) or (2) can be used either singly or in combination. Moreover, combinations of one or more other dyes with the compounds of the present invention make it possible to produce polarizing films having a high degree of polarization and being dyed in various hues.

When such other dyes are combined, any dyes can be used as such other dyes as long as they have characteristic absorption in a wavelength range different from those of the compounds of the present invention and are provided with a high degree of dichroism. The followings are examples of particularly preferred dyes as expressed in terms of color index (C.I.) generic names:

| | |
|---|---|
| C.I. Direct Yellow 12, | C.I. Direct Yellow 44, |
| C.I. Direct Yellow 28, | C.I. Direct Yellow 142, |
| C.I. Direct Red 2, | C.I. Direct Red 79, |
| C.I. Direct Red 81, | C.I. Direct Red 247, |
| C.I. Direct Violet 9, | C.I. Direct Violet 51, |
| C.I. Direct Orange 26, | C.I. Direct Orange 39, |
| C.I. Direct Orange 107, | C.I. Direct Blue 1, |
| C.I. Direct Blue 71, | C.I. Direct Blue 78, |
| C.I. Direct Blue 168, | C.I. Direct Blue 202, |
| C.I. Direct Brown 106, | C.I. Direct Brown 223, |
| C.I. Direct Green 85, | C.I. Direct Black 17, |
| C.I. Direct Black 19. | |

When a compound represented by the formula (1) or (2) is employed as a component for a gray or black color which is used particularly widely, polarizing films capable of exhibiting superb polarizing performance and preferred absorption characteristics can be obtained. Moreover, their hydrothermo resistance is excellent.

The polarizing films produced as described above can be used by applying various processing thereto. For example, they can be formed as films or sheets and can be used as they are. Depending on application purposes, they can be laminated with a polymer such as a triacetate, acrylic or urethane polymer to form protective layers thereon. Further, transparent conductive films of indium-tin oxides or the like can be formed for actual applications on the surfaces of the polarizing films by a vacuum depositing, sputtering or coating process.

The present invention will hereinafter be described specifically by examples. It is to be noted that these examples are merely illustrative and are not intended to limit the present invention thereto. In the examples, the structural formula is shown in the form of a free acid. All designations of "part" or "parts" in the examples indicate part or parts by weight.

The term "degree of polarization" as used herein is a value measured by the following method. Namely, two polarizing films were placed in the optical path of a spectrophotometer with their stretched directions extending in parallel with each other. Based on the light transmittance (T∥) so measured at the absorption maximum wavelength in the visible range and the light transmittance (T⊥) at the same wavelength as measured by superposing the two polarizing films with their stretched directions extending at a right angle, the degree of polarization (V) was calculated using the following formula:

$$V = \sqrt{\frac{T\| - T\perp}{T\| + T\perp}} \times 100 \, (\%).$$

EXAMPLE 1

In 321 parts of water, 32.1 parts of 4'-amino-4-biphenylcarboxylic acid were suspended, followed by the addition of 54.9 parts of 35% hydrochloric acid. After the resultant suspension was cooled to 0°–10° C., 57 parts of a 20% aqueous solution of sodium nitrite were added dropwise. They were reacted at that temperature for 2 hours. Sulfamic acid was then added to the reaction mixture to eliminate excess sodium nitrite, whereby a diazo compound solution was obtained. A solution, which had been prepared separately by adding 20.7 parts of p-cresidine to a mixture of 207 parts of water and 20.4 parts of 35% hydrochloric acid, was added to the diazo compound solution, followed by stirring at 0°–10° C. for two hours, whereby coupling was effected. After the completion of the coupling, the reaction mixture was filtered. The filtercake so obtained was dried, whereby 51.2 parts of the compound represented by the following formula (A):

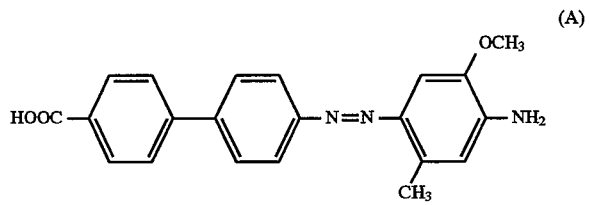

were obtained.

The compound (A) (16.2 parts) and 1.8 parts of sodium hydroxide were then added to 535.3 parts of water. After they were stirred at room temperature for one hour, 4.7 parts of sodium nitrite was added to the resultant mixture, followed by stirring for further 30 minutes. To the reaction mixture, 164 parts of 5% hydrochloric acid were added, followed by reaction at room temperature for two hours. Sulfamic acid was then added to the reaction mixture to eliminate excess sodium nitrite, whereby a diazo compound solution was obtained. The diazo compound solution was added at room temperature to a solution which had been prepared separately by adding 14.2 parts of N-phenyl J acid and 11.7 parts of sodium hydroxide to 284 parts of water and then stirring the resultant mixture at room temperature for one hour. The resultant mixture was stirred for 2 hours, whereby coupling was effected. After the completion of the coupling, sodium chloride was added in a great excess to induce salting out. Subsequent to stirring for one hour, the reaction mixture was filtered. The filtercake so obtained was washed with a 10% aqueous solution of sodium chloride and then dried, whereby 31.7 parts of the compound represented by the following formula (B):

result, the single plate transmittance, $\lambda_{max}$ and V were found to be 40%, 565 nm and 99.8%, respectively, which are excellent.

The polarizing film so obtained was left over for 500 hours under the conditions of 80° C. and 85% RH. Neither change in hue nor reduction in the degree of polarization was observed practically.

EXAMPLE 2

The compound (A) (8.1 parts) and 0.9 part of sodium hydroxide were added to 81 parts of water and they were stirred at room temperature for one hour. The resultant mixture was cooled to 0°–10° C., followed by the addition of 100 parts of 3% hydrochloric acid and the dropwise addition of 7.8 parts of a 20% aqueous solution of nitrous acid, whereby they were reacted. Sulfamic acid was then added to the reaction mixture to eliminate excess sodium nitrite, whereby a diazo compound solution was obtained. The diazo compound solution was added at that temperature to a solution which had been prepared separately by adding 8.4 parts of H acid and 3.9 parts of sodium carbonate to 168 parts of water, cooling the resultant mixture to 0°–10° C. and stirring the mixture for one hour. The resultant mixture was stirred for 2 hours so that coupling was effected. After the completion of the coupling, sodium chloride was added in a great excess to induce salting out. The reaction mixture was stirred for one hour and filtered. The filtercake so obtained was washed with a 10% aqueous solution of sodium chloride and dried, whereby 31.7 parts of the compound represented by the following formula (C) were obtained.

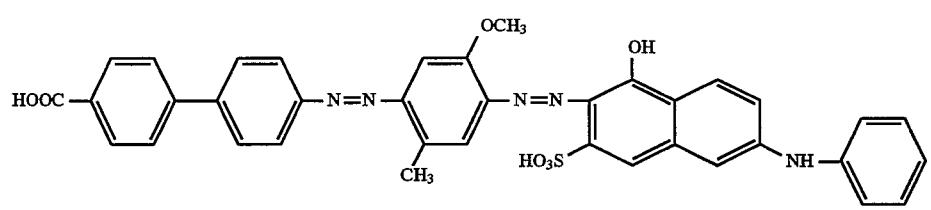

were obtained.

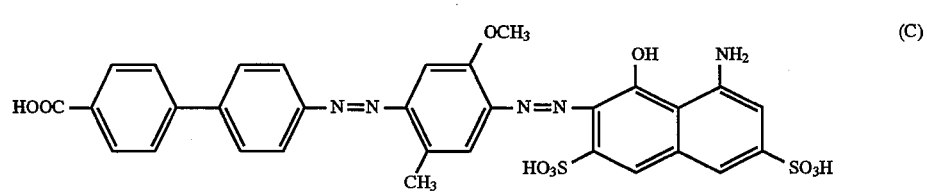

The compound (B) was formulated into a 0.25 g/l dye bath. The dye bath was maintained at 42° C., in which a polyvinyl alcohol film of 75 µm thick was immersed to dye it for 10 minutes. The film so dyed was stretched 5 times at 43° C. in a 3% aqueous solution of boric acid. In the stretched state, the film was rinsed with water and dried so that a polarizing film having a purple color was produced.

The degree of polarization V of the polarizing film at its absorption maximum wavelength $\lambda_{max}$ was measured. As a The compound (C) was formulated into a 0.25 g/l dye bath. The dye bath was maintained at 42° C., in which a polyvinyl alcohol film of 75 µm thick was immersed to dye it for 10 minutes. The film so dyed was stretched 5 times at 43° C. in a 3% aqueous solution of boric acid. In the stretched state, the film was rinsed with water and dried so that a polarizing film having a blue color was produced.

The degree of polarization V of the polarizing film at its absorption maximum wavelength $\lambda_{max}$ was measured. As a result, the single plate transmittance, $\lambda_{max}$ and V were found to be 40%, 595 nm and 99.8%, respectively, which are excellent.

The polarizing film so obtained was left over for 500 hours under the conditions of 80° C. and 85% RH. Neither change in hue nor reduction in the degree of polarization was observed practically.

EXAMPLE 3

To 280 parts of water, 16.8 parts of the compound (B), which had been described above in Example 1, were added, followed by the addition of 16 parts of monoethanolamine, 4 parts of aqueous ammonia and 6 parts of copper sulfate. Subsequent to stirring at 90° C. for 6 hours, sodium chloride was added in a great excess to induce salting out. The reaction mixture was stirred for one hour, followed by filtration. The filtercake so obtained was washed with a 10% aqueous solution of sodium chloride and dried, whereby 16.5 parts of the compound represented by the following formula (D):

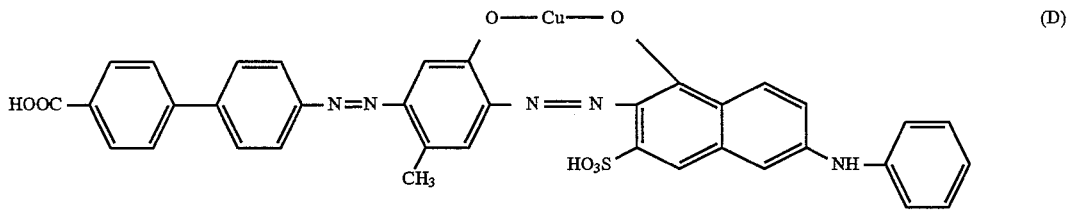

were obtained.

The compound (D) was formulated into a 0.25 g/l dye bath. The dye bath was maintained at 42° C., in which a polyvinyl alcohol film of 75 μm thick was immersed to dye it for 10 minutes. The film so dyed was stretched 5 times at 43° C. in a 3% aqueous solution of boric acid. In the stretched state, the film was rinsed with water and dried so that a polarizing film having a blue color was produced.

The degree of polarization V of the polarizing film at its absorption maximum wavelength $\lambda_{max}$ was measured. As a result, the single plate transmittance, $\lambda_{max}$ and V were found to be 40%, 600 nm and 99.8%, respectively, which are excellent.

The polarizing film so obtained was left over for 500 hours under the conditions of 80° C. and 85% RH. Neither change in hue nor reduction in the degree of polarization was observed practically.

EXAMPLES 4–27

In a similar manner to Example 1 except that the azo compounds shown in Table 1 were employed as a dye instead, polarizing films were produced, respectively.

In Table 1, the structural formula of each dye and the single plate transmittance, degree of polarization and hue of the polarizing film obtained by dyeing a polyvinyl alcohol film with the dye are shown. Concerning hydrothermo resistance, the polarizing film was indicated as "0" where neither change in hue nor reduction in degree of polarization was observed practically even after it was left over for 500 hours under the condition of 80° C. and 85% RH. All the polarizing films so obtained had excellent polarizing performance.

TABLE 1

| Example | Structural formula | Single plate transmittance (%) | Degree of polarization (%) | Hue | Hydro-thermo resistance |
|---|---|---|---|---|---|
| 4 | (structure with Cu complex, NH2, SO3H, CH3, azo, benzothiazole-SO3H) | 41 | 99.5 | Blue | ○ |
| 5 | (structure with NHCO-phenyl, OH, OCH3, CH3, azo, benzothiazole-SO3H) | 41 | 99.0 | Reddish purple | ○ |
| 6 | (structure with NHCO-phenyl, Cu-O, CH3, azo, benzothiazole-SO3H) | 41 | 99.0 | Purple | ○ |
| 7 | (structure with NH-phenyl, OH, OCH3, CH3, azo, benzothiazole-SO3H) | 41 | 99.7 | Purple | ○ |

TABLE 1-continued

| Example | Structural formula | Single plate transmittance (%) | Degree of polarization (%) | Hue | Hydro-thermo resistance |
|---|---|---|---|---|---|
| 8 | (structure) | 41 | 99.0 | Red | ○ |
| 9 | (structure) | 41 | 99.2 | Red | ○ |
| 10 | (structure) | 40 | 99.4 | Reddish purple | ○ |
| 11 | (structure) | 41 | 99.1 | Reddish purple | ○ |
| 12 | (structure) | 41 | 99.0 | Red | ○ |

TABLE 1-continued

| Example | Structural formula | Single plate transmittance (%) | Degree of polarization (%) | Hue | Hydro-thermo resistance |
|---|---|---|---|---|---|
| 13 | | 40 | 99.5 | Bluish Purple | ○ |
| 14 | | 40 | 99.4 | Bluish Purple | ○ |
| 15 | | 41 | 99.1 | Red | ○ |
| 16 | | 41 | 99.0 | Red | ○ |

TABLE 1-continued

| Example | Structural formula | Single plate transmittance (%) | Degree of polarization (%) | Hue | Hydrothermo resistance |
|---|---|---|---|---|---|
| 17 | (structure) | 40 | 99.5 | Red | ○ |
| 18 | (structure) | 40 | 99.4 | Reddish purple | ○ |
| 19 | (structure) | 41 | 99.1 | Reddish purple | ○ |
| 20 | (structure) | 41 | 99.5 | Red | ○ |
| 21 | (structure) | 41 | 99.0 | Bluish Purple | ○ |

TABLE 1-continued

| Example | Structural formula | Single plate transmittance (%) | Degree of polarization (%) | Hue | Hydro-thermo resistance |
|---|---|---|---|---|---|
| 22 | | 41 | 99.0 | Blue | ○ |
| 23 | | 41 | 99.7 | Blue | ○ |
| 24 | | 41 | 99.7 | Reddish purple | ○ |
| 25 | | 41 | 99.4 | Blue | ○ |

TABLE 1-continued
| Example | Structural formula | Single plate transmittance (%) | Degree of polarization (%) | Hue | Hydro-thermo resistance |
|---|---|---|---|---|---|
| 26 | 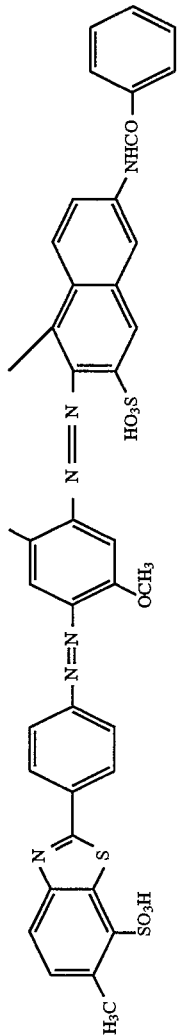 | 40 | 99.5 | Bluish Purple | ○ |
| 27 | 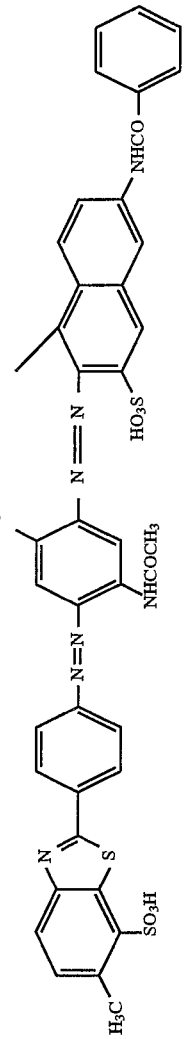 | 40 | 99.6 | Bluish Purple | ○ |

EXAMPLE 28

In a similar manner to Example 1, a neutral-color polarizing film was produced by using a dye composition, which had been prepared by proportioning 0.08 wt. % of the invention dye of Example 4, 0.045 wt. % of C.I. Direct Red 2, 0.006 wt. % of C.I. Direct Yellow 12 and 0.04 wt. % of C.I. Direct Violet 9. The degree of polarization of the polarizing film so obtained was measured. As a result, the degree of polarization at 41% single plate transmittance was 99.0%, i.e. excellent.

EXAMPLE 29

In 144 parts of water, 14.4 parts of 2-(p-aminophenyl)-6-methylbenzothiazole-7-sulfonic acid and 1.8 parts of sodium hydroxide were dissolved, followed by the addition of 16.4 parts of 35% hydrochloric acid. Subsequent to cooling to 0°–10° C., 17 parts of a 20% aqueous solution of sodium nitrite were added dropwise to the resultant mixture, followed by reaction for 2 hours at that temperature. Sulfamic acid was then added to the reaction mixture to eliminate excess sodium nitrite, whereby a diazo compound solution was obtained. A solution, which had been prepared separately by adding 6.2 parts of p-cresidine to a mixture of 62 parts of water and 6.2 parts of 35% hydrochloric acid, was added to the above diazo compound solution and they were stirred at 0°–10° C. for 2 hours, whereby coupling was effected. After the completion of the coupling, the reaction mixture was filtered, followed by drying, whereby 17.2 parts of the compound represented by the following formula (E) were obtained.

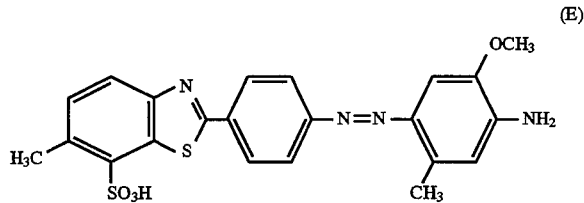

(E)

The compound (E) (14.7 parts) were added to 356.9 parts of water, followed by the addition of a 10% aqueous solution of sodium hydroxide to dissolve the compound (E). After the resultant solution was stirred at room temperature for one hour, 2.1 parts of sodium nitrite were added and they were stirred for further 30 minutes. To the resultant solution, 109 parts of 5% hydrochloric acid were added, followed by the reaction at room temperature for 2 hours. Sulfamic acid was then added to the reaction mixture to eliminate excess sodium nitrite, whereby a diazo compound solution was obtained. The diazo compound solution was added at room temperature to a solution which had been prepared separately by adding 9.5 parts of N-phenyl J acid and 7.8 parts of sodium hydroxide to 189 parts of water and then stirring at room temperature for one hour. The resultant mixture was stirred for 2 hours, whereby coupling was effected. After the completion of the coupling, sodium chloride was added in a great excess to induce salting out. The reaction mixture was stirred for one hour and then filtered. The filtercake so obtained was washed with a 10% aqueous solution of sodium chloride and dried, whereby 17.3 parts of the compound represented by the following formula (F):

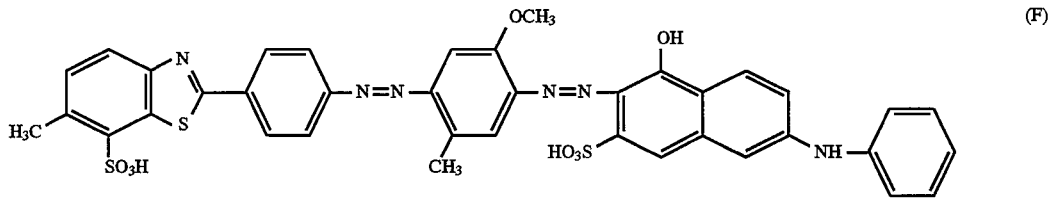

(F)

were obtained.

The compound (F) was formulated into a 0.25 g/l dye bath. The dye bath was maintained at 42° C., in which a polyvinyl alcohol film of 75 μm thick was immersed to dye it for 10 minutes. The film so dyed, which was stretched 5 times at 43° C. in a 3% aqueous solution of boric acid. In the stretched state, the film was rinsed with water and dried so that a polarizing film having a purple color was produced.

The degree of polarization V of the polarizing film at its absorption maximum wavelength $\lambda_{max}$ was measured. As a result, the single plate transmittance, $\lambda_{max}$ and V were found to be 40%, 570 nm and 99.5%, respectively, which are excellent.

The polarizing film so obtained was left over for 500 hours under the conditions of 80° C. and 85% RH. Neither change in hue nor reduction in the degree of polarization was observed practically.

EXAMPLE 30

In 120 parts of water, 10.5 parts of the compound (E) and 0.9 part of sodium hydroxide were added, followed by stirring at room temperature for one hour. The resultant mixture was cooled to 0°–10° C., followed by the addition of 100 parts of 3% hydrochloric acid and then by the dropwise addition of 7.8 parts of a 20% aqueous solution of nitrous acid, whereby they were reacted. Sulfamic acid was then added to the reaction mixture to eliminate excess sodium nitrite so that a diazo compound solution was obtained. To a solution, which had been prepared separately by adding 7.6 parts of H acid and 3.5 parts of sodium carbonate in 151 parts of water, cooling the resultant mixture to 0°–10° C. and then stirring for one hour, the diazo compound solution so obtained was added at that temperature. The resultant mixture was stirred for 2 hours, whereby coupling was effected. After the completion of the coupling, sodium chloride was in a great excess to induce salting out. The reaction mixture was stirred for one hour and then filtered. The filtercake so obtained was washed with a 10% aqueous solution of sodium chloride and then dried, whereby 14.7 parts of the compound represented by the formula (G):

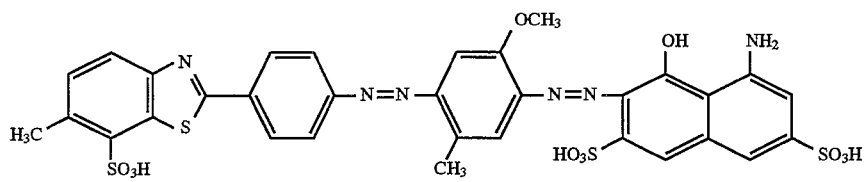

were obtained.

The compound (G) was formulated into a 0.25 g/l dye bath. The dye bath was maintained at 42° C., in which a polyvinyl alcohol film of 75 μm thick was immersed to dye it for 10 minutes. The film so dyed was stretched 5 times at 43° C. in a 3% aqueous solution of boric acid. In the stretched state, the film was rinsed with water and dried so that a polarizing film having a blue color was produced.

The degree of polarization V of the polarizing film at its absorption maximum wavelength $\lambda_{max}$ was measured. As a result, the single plate transmittance, $\lambda_{max}$ and V were found to be 40%, 590 nm and 99.3%, respectively, which are excellent.

The polarizing film so obtained was left over for 500 hours under the conditions of 80° C. and 85% RH. Neither change in hue nor reduction in the degree of polarization was observed practically.

EXAMPLE 31

To 293 parts of water, 18.3 parts of the compound (F) of Example 29 were added, followed by the addition of 16 parts of monoethanolamine, 4 parts of aqueous ammonia and 6 parts of copper sulfate. After they were stirred at 90° C. for 6 hours, sodium chloride was added to the resultant mixture in a great excess to induce salting out. The reaction mixture was stirred for one hour and then filtered. The filtercake so obtained was washed with a 10% aqueous solution of sodium chloride and dried, whereby 15.1 parts of the compound represented by the formula (H):

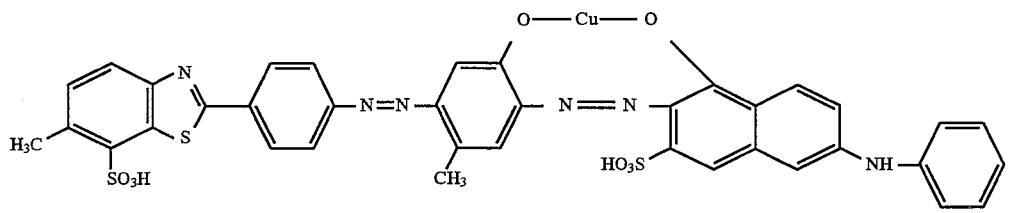

were obtained.

The compound (H) was formulated into a 0.25 g/l dye bath. The dye bath was maintained at 42° C., in which a polyvinyl alcohol film of 75 μm thick was immersed to dye it for 10 minutes. The film so dyed was stretched 5 times at 43° C. in a 3% aqueous solution of boric acid. In the stretched state, the film was rinsed with water and dried so that a polarizing film having a blue color was obtained.

The degree of polarization V of the polarizing film at its absorption maximum wavelength $\lambda_{max}$ was measured. As a result, the single plate transmittance, $\lambda_{max}$ and V were found to be 41%, 600 nm and 99.2%, respectively, which are excellent.

The polarizing film so obtained was left over for 500 hours under the conditions of 80° C. and 85% RH. Neither change in hue nor reduction in the degree of polarization was observed practically.

EXAMPLES 32–103

In a similar manner to Example 29 except that the azo compounds shown in Table 2 were employed instead, polarizing films were produced, respectively.

In Table 2, the structural formula of each dye and the single plate transmittance, degree of polarization and hue of the polarizing film obtained by dyeing a polyvinyl alcohol film with the dye are shown. Concerning hydrothermo resistance, the polarizing film was ranked as "0" where neither change in hue nor reduction in the degree of polarization was observed practically even after it was left over for 500 hours under the condition of 80° C. and 85% RH. All the polarizing films so obtained had excellent polarizing performance.

TABLE 2

| Example | Structural formula | Single plate transmittance (%) | Degree of polarization (%) | Hue | Hydro- thermo resistance |
|---|---|---|---|---|---|
| 32 | (structure with Cu complex, azo, benzothiazole) | 41 | 99.5 | Blue | ○ |
| 33 | (structure with NHCO-phenyl, azo, benzothiazole) | 41 | 99.0 | Reddish purple | ○ |
| 34 | (structure with Cu complex, NHCO-phenyl, azo, benzothiazole) | 41 | 99.0 | Purple | ○ |
| 35 | (structure with NH-phenyl, azo, benzothiazole) | 41 | 99.7 | Purple | ○ |

TABLE 2-continued

| Example | Structural formula | Single plate transmittance (%) | Degree of polarization (%) | Hue | Hydro-thermo resistance |
|---|---|---|---|---|---|
| 36 | (structure) | 41 | 99.0 | Red | ◯ |
| 37 | (structure) | 41 | 99.2 | Red | ◯ |
| 38 | (structure) | 40 | 99.4 | Reddish purple | ◯ |
| 39 | (structure) | 41 | 99.1 | Reddish purple | ◯ |
| 40 | (structure) | 41 | 99.0 | Red | ◯ |

TABLE 2-continued

| Example | Structural formula | Single plate transmittance (%) | Degree of polarization (%) | Hue | Hydro-thermo resistance |
|---|---|---|---|---|---|
| 41 | (structure) | 40 | 99.5 | Bluish Purple | ○ |
| 42 | (structure) | 40 | 99.4 | Bluish Purple | ○ |
| 43 | (structure) | 41 | 99.1 | Red | ○ |
| 44 | (structure) | 41 | 99.0 | Red | ○ |

TABLE 2-continued

| Example | Structural formula | Single plate transmittance (%) | Degree of polarization (%) | Hue | Hydro-thermo resistance |
|---------|--------------------|--------------------------------|----------------------------|-----|-------------------------|
| 45 | | 40 | 99.5 | Red | ○ |
| 46 | | 40 | 99.4 | Reddish purple | ○ |
| 47 | | 41 | 99.1 | Reddish purple | ○ |
| 48 | | 41 | 99.5 | Red | ○ |
| 49 | | 41 | 99.0 | Bluish Purple | ○ |

TABLE 2-continued

| Example | Structural formula | Single plate transmittance (%) | Degree of polarization (%) | Hue | Hydro-thermo resistance |
|---|---|---|---|---|---|
| 50 | | 41 | 99.0 | Blue | ○ |
| 51 | | 41 | 99.7 | Blue | ○ |
| 52 | | 41 | 99.7 | Reddish purple | ○ |
| 53 | | 41 | 99.4 | Blue | ○ |

TABLE 2-continued

| Example | Structural formula | Single plate transmittance (%) | Degree of polarization (%) | Hue | Hydro-thermo resistance |
|---|---|---|---|---|---|
| 54 | | 40 | 99.5 | Bluish Purple | ◯ |
| 55 | | 40 | 99.6 | Bluish Purple | ◯ |
| 56 | | 41 | 99.5 | Red | ◯ |
| 57 | | 41 | 99.5 | Red | ◯ |
| 58 | | 41 | 99.4 | Reddish purple | ◯ |

TABLE 2-continued

| Example | Structural formula | Single plate transmittance (%) | Degree of polarization (%) | Hue | Hydro-thermo resistance |
|---|---|---|---|---|---|
| 59 | | 41 | 99.4 | Reddish purple | ○ |
| 60 | | 41 | 99.5 | Blue | ○ |
| 61 | | 41 | 99.4 | Blue | ○ |
| 62 | | 41 | 99.3 | Blue | ○ |

TABLE 2-continued

| Example | Structural formula | Single plate transmittance (%) | Degree of polarization (%) | Hue | Hydro-thermo resistance |
|---|---|---|---|---|---|
| 63 | | 41 | 99.5 | Blue | ○ |
| 64 | | 40 | 99.3 | Red | ○ |
| 65 | | 40 | 99.3 | Reddish purple | ○ |
| 66 | | 40 | 99.3 | Red | ○ |

TABLE 2-continued

| Example | Structural formula | Single plate transmittance (%) | Degree of polarization (%) | Hue | Hydro-thermo resistance |
|---|---|---|---|---|---|
| 67 | | 40 | 99.3 | Reddish purple | ○ |
| 68 | | 41 | 99.3 | Reddish purple | ○ |
| 69 | | 41 | 99.3 | Red | ○ |
| 70 | | 41 | 99.0 | Reddish purple | ○ |
| 71 | | 41 | 99.0 | Reddish purple | ○ |

TABLE 2-continued

| Example | Structural formula | Single plate transmittance (%) | Degree of polarization (%) | Hue | Hydrothermo resistance |
|---|---|---|---|---|---|
| 72 | (structure) | 41 | 99.2 | Red | ○ |
| 73 | (structure) | 40 | 99.2 | Red | ○ |
| 74 | (structure) | 41 | 99.0 | Red | ○ |
| 75 | (structure) | 40 | 99.1 | Red | ○ |
| 76 | (structure) | 41 | 99.2 | Red | ○ |

TABLE 2-continued

| Example | Structural formula | Single plate transmittance (%) | Degree of polarization (%) | Hue | Hydro-thermo resistance |
|---|---|---|---|---|---|
| 77 | | 41 | 99.2 | Red | ○ |
| 78 | | 41 | 99.2 | Reddish purple | ○ |
| 79 | | 41 | 99.2 | Reddish purple | ○ |
| 80 | | 40 | 99.4 | Blue | ○ |
| 81 | | 40 | 99.4 | Blue | ○ |

TABLE 2-continued

| Example | Structural formula | Single plate transmittance (%) | Degree of polarization (%) | Hue | Hydro-thermo resistance |
|---|---|---|---|---|---|
| 82 | (structure with biphenyl-benzoxazole, azo linkages, Cu-O coordination, OCH₃, methylnaphthalene-SO₃H, NHCO-phenyl) | 41 | 99.3 | Blue | ○ |
| 83 | (structure with biphenyl-benzoxazole, azo linkages, Cu-O coordination, CH₃, methylnaphthalene-SO₃H, NH-phenyl) | 41 | 99.3 | Blue | ○ |
| 84 | (structure with phenyl-benzoxazole, azo linkages, Cu-O coordination, CH₃, methylnaphthalene-SO₃H, NHCO-phenyl) | 41 | 99.3 | Blue | ○ |
| 85 | (structure with phenyl-benzoxazole, azo linkages, Cu-O coordination, CH₃, methylnaphthalene-SO₃H, NH-phenyl) | 41 | 99.3 | Blue | ○ |

TABLE 2-continued

| Example | Structural formula | Single plate transmittance (%) | Degree of polarization (%) | Hue | Hydro-thermo resistance |
|---|---|---|---|---|---|
| 86 | | 41 | 99.3 | Blue | ○ |
| 87 | | 41 | 99.2 | Blue | ○ |
| 88 | | 40 | 99.1 | Red | ○ |
| 89 | | 40 | 99.1 | Red | ○ |
| 90 | | 40 | 99.0 | Red | ○ |

TABLE 2-continued

| Example | Structural formula | Single plate transmittance (%) | Degree of polarization (%) | Hue | Hydro-thermo resistance |
|---|---|---|---|---|---|
| 91 | | 40 | 99.0 | Red | ○ |
| 92 | | 41 | 99.1 | Purple | ○ |
| 93 | | 41 | 99.1 | Purple | ○ |
| 94 | | 40 | 99.2 | Purple | ○ |

TABLE 2-continued

| Example | Structural formula | Single plate transmittance (%) | Degree of polarization (%) | Hue | Hydro-thermo resistance |
|---|---|---|---|---|---|
| 95 | | 40 | 99.2 | Purple | ◯ |
| 96 | | 40 | 99.3 | Bluish Purple | ◯ |
| 97 | | 40 | 99.2 | Bluish Purple | ◯ |
| 98 | | 41 | 99.1 | Bluish Purple | ◯ |

TABLE 2-continued

| Example | Structural formula | Single plate transmittance (%) | Degree of polarization (%) | Hue | Hydro-thermo resistance |
|---|---|---|---|---|---|
| 99 | | 40 | 99.1 | Bluish Purple | ○ |
| 100 | | 40 | 99.3 | Blue | ○ |
| 101 | | 40 | 99.2 | Blue | ○ |
| 102 | | 40 | 99.2 | Blue | ○ |

TABLE 2-continued

| Example | Structural formula | Single plate transmittance (%) | Degree of polarization (%) | Hue | Hydro-thermo resistance |
|---|---|---|---|---|---|
| 103 | (structure shown) | 41 | 99.1 | Blue | ○ |

EXAMPLE 104

In a similar manner to Example 29, a neutral-color polarizing film was produced by using a dye composition, which had been prepared by proportioning 0.08 wt. % of the invention dye of Example 32, 0.045 wt. % of C.I. Direct Red 2, 0.006 wt. % of C.I. Direct Yellow 12 and 0.04 wt. % of C.I. Direct Violet 9. The degree of polarization V of the polarizing film so obtained was measured. As a result, the degree of polarization at 41% single plate transmittance was 99.0%, i.e. excellent.

Comparative Example 1

In a similar manner to Example 1 except that the azo compound, which had been synthesized in Example 1, was replaced by the compound disclosed in Example 3 of Japanese Patent Laid-Open No. 145255/1984 and represented by the following structural formula (I):

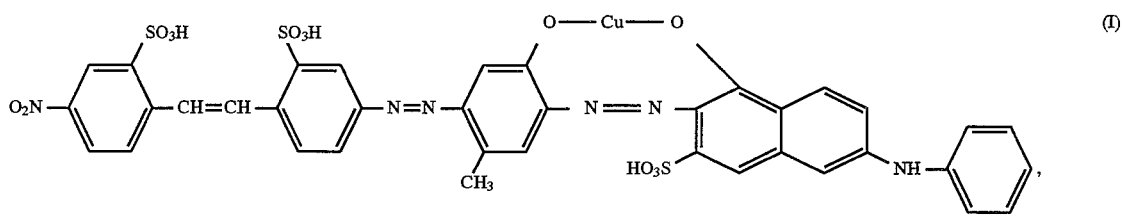

a polarizing film was produced.

The degree of polarization V of the polarizing film at its absorption maximum wavelength $\lambda_{max}$ was measured. As a result, the single plate transmittance, $\lambda_{max}$ and V were found to be 41%, 625 nm and 98.0%, respectively, which are inferior to those of the polarizing films according to the present invention.

Comparative Example 2

In a similar manner to Example 1 except that the azo compound, which had been synthesized in Example 1, was replaced by the compound which had been disclosed in Japanese Patent Laid-Open No. 89203/1991 as the compound represented by the formula (VIII) and is represented by the following structural formula (J):

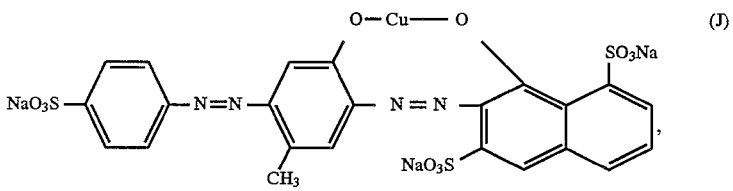

a polarizing film was produced.

The degree of polarization V of the polarizing film at its absorption maximum wavelength $\lambda_{max}$ was measured. As a result, the single plate transmittance, $\lambda_{max}$ and V were found to be 41%, 585 nm and 98.0%, respectively, which are inferior to those of the polarizing films according to the present invention.

Comparative Example 3

In a similar manner to Example 28 except that the azo compound, which had been synthesized in Example 4, was replaced by the compound which had been disclosed in Example 10 of Japanese Patent Laid-Open No. 68902/1991 and is represented by the following formula (K):

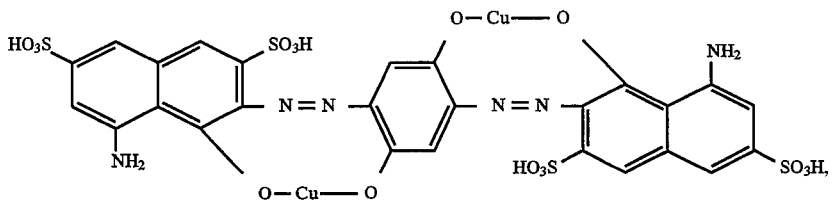
(K)

a neutral-color polarizing film was produced.

The degree of the polarization V of the polarizing film was measured. As a result, the degree of the polarization of the film at 41% single plate transmittance was 97.0%, which is inferior to that of the polarizing films according to the present invention.

Comparative Example 4

In a similar manner to Example 29 except that the azo compound, which had been synthesized in Example 29, was replaced by the compound which had been disclosed as Compound No. 3 in Japanese Patent Laid-Open No. 153648/1979 and is represented by the following formula (L):

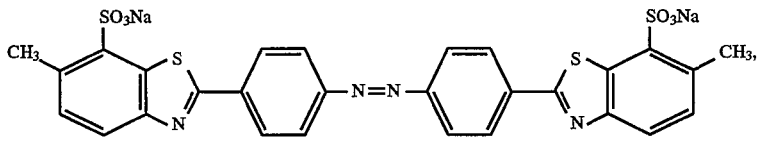
(L)

a polarizing film was produced.

The degree of the polarization V of the polarizing film at its absorption maximum wavelength $\lambda_{max}$ was measured. As a result, the single plate transmittance, $\lambda_{max}$ and V were found to be 41%, 450 nm and 95%, which are inferior to those of the polarizing films according to the present invention.

What is claimed is:

1. A polarizing film comprising a polymer film and an azo compound distributed in an oriented state in the polymer film, wherein said azo compound is represented by the following formula (2):

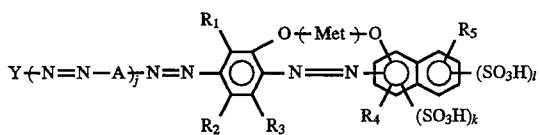
(2)

wherein Y represents a group represented by the following formula (1a) or (1b):

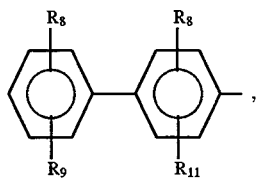
(1a)

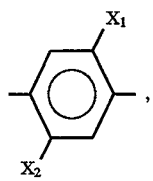
(1b)

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxyl group, an ethoxyl group or a hydroxyl group, Z represents an oxygen atom, a sulfur atom or —NH— group, m stands for 0, 1 or 2, n stands for 0, 1 or 2, and p stands for 0, 1 or 2;

$R_1$ represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus is unsubstituted or substituted by one or more nitro, amino, hydroxyl, methyl, ethyl, carboxyl and/or sulfonic acid groups and/or chlorine atoms; Met represents a copper, nickel, zinc or iron atom; j stands for 0 or 1, k stands for 0 or 1, l stands for 0, 1 or 2; and A represents a connecting group represented by the following formula (1c) or (1d):

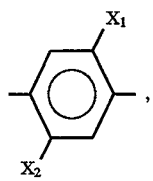
(1c)

-continued

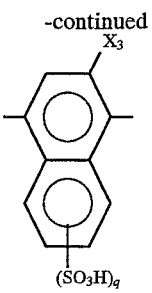
(1d)

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1.

2. A polarizing film obtained by dyeing a polymer film with a water-soluble dye and then stretching the dyed film at a draw ratio of 2 to 9 times, wherein said water-soluble dye comprises an azo compound represented by the following formula (2):

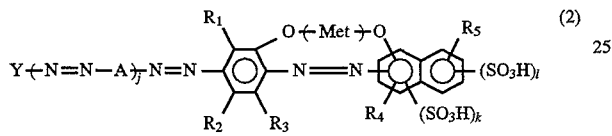
(2)

wherein Y represents a group represented by the following formula (1a) or (1b):

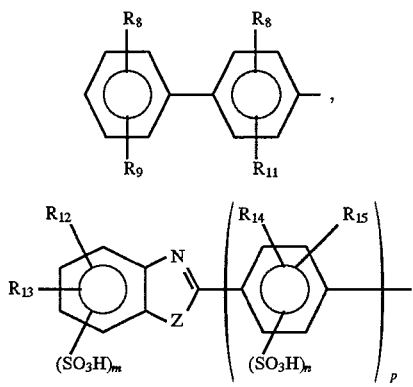

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxyl group, an ethoxyl group or a hydroxyl group, Z represents an oxygen atom, a sulfur atom or —NH— group, m stands for 0, 1 or 2, n stands for 0, 1 or 2, and p stands for 0, 1 or 2;

$R_1$ represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus is unsubstituted or substituted by one or more nitro, amino, hydroxyl, methyl, ethyl, carboxyl and/or sulfonic acid groups and/or chlorine atoms; Met represents a copper, nickel, zinc or iron atom; j stands for 0 or 1, k stands for 0 or 1, 1 stands for 0, 1 or 2; and A represents a connecting group represented by the following formula (1c) or (1d):

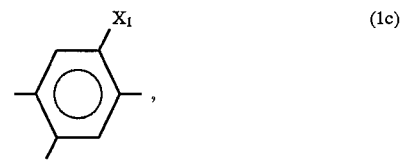
(1c)

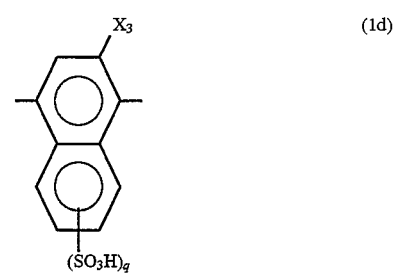
(1d)

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1.

3. A polarizing film according to claim 2, wherein the polymer film is made of at least one material selected from the group consisting of polyvinyl alcohol, polyvinyl formal, polyvinyl acetal, polyvinyl butyral, those obtained by modifying polyvinyl alcohol, polyvinyl formal, polyvinyl acetal and polyvinyl butyral with ethylene, propylene, acrylic acid or acrylamide maleate, and a cellulose resin.

4. A process for the production of a polarizing film, which comprises dyeing a polymer film with a water-soluble dye and then stretching the dyed fill at a draw ratio of 2 to 9 times, wherein said water-soluble dye comprises an azo compound represented by the following formula (2):

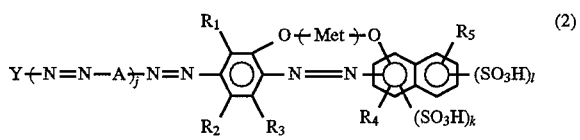
(2)

wherein Y represents a group represented by the following formula (1a) or (1b):

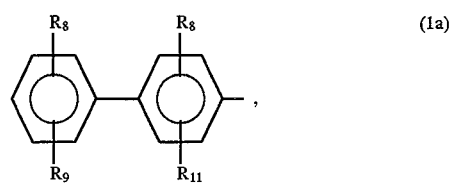
(1a)

-continued

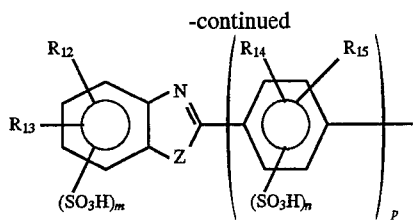

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxyl group, an ethoxyl group or a hydroxyl group, Z represents an oxygen atom, a sulfur atom or —NH— group, m stands for 0, 1 or 2, n stands for 0, 1 or 2, and p stands for 0, 1 or 2;

$R_1$ represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus is unsubstituted or substituted by one or more nitro, amino, hydroxyl, methyl, ethyl, carboxyl and/or sulfonic acid groups and/or chlorine atoms; Met represents a copper, nickel, zinc or iron atom; j stands for 0 or 1, k stands for 0 or 1, l stands for 0, 1 or 2; and A represents a connecting group represented by the following formula (1c) or (1d):

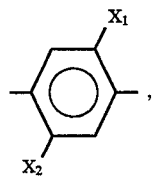

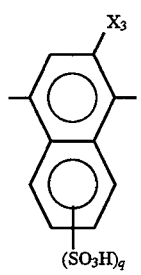

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1.

5. A polarizing film comprising a polymer film and an azo compound distributed in an oriented state in the polymer film, wherein said azo compound is represented by the following formula (1):

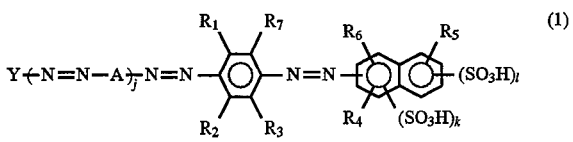

wherein Y represents a group represented by the following formula (1a) or (1b):

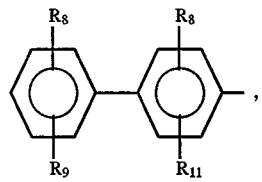

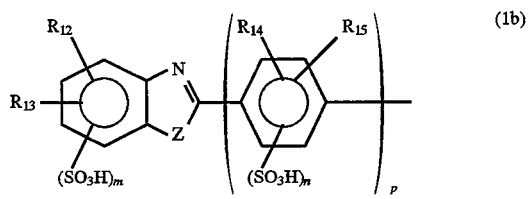

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxl group, an ethoxyl group or a hydroxyl group, Z represents an oxygen atom, a sulfur atom or —NH— group, m stands for 0, 1 or 2, n stands for 0, 1 or 2; and p stands for 0, 1 or 2;

$R_1$ and $R_7$ each independently represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group, or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus is unsubstituted or substituted by one or more nitro, amino, hydroxyl, methyl, ethyl, carboxyl and/or sulfonic acid groups and/or chlorine atoms; $R_6$ represents a hydroxyl or amino group substituted at the o- or p-position relative to the azo group; j stands for 0 or 1, k stands for 0 or 1, l stands for 0, 1 or 2; A represents a connecting group represented by the following formula (1c) or (1d):

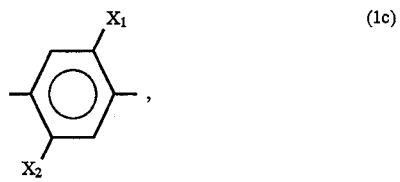

-continued

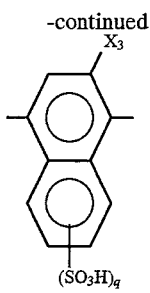

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1.

6. A polarizing film obtained by dyeing a polymer film with a water-soluble dye and then stretching the dyed film at a draw ratio of 2 to 9 times, wherein said water-soluble dye comprises an azo compound represented by the following formula (1):

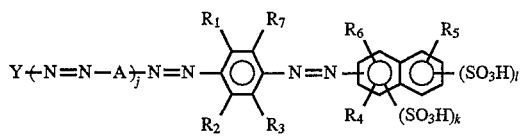

wherein Y represents a group represented by the following formula (1a) or (1b):

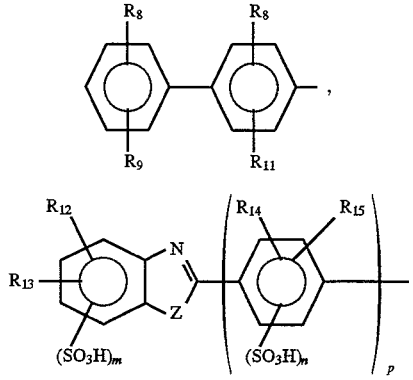

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxyl group, an ethoxyl group or a hydroxyl group, Z represents an oxygen atom, a sulfur atom or —NH— group, m stands for 0, 1 or 2, n stands for 0, 1 or 2; and p stands for 0, 1 or 2;

$R_1$ and $R_7$ each independently represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group, or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus is unsubstituted or substituted by one or more nitro, amino, hydroxyl, methyl, ethyl, carboxyl and/or sulfonic acid groups and/or chlorine atoms; $R_6$ represents a hydroxyl or amino group substituted at the o- or p-position relative to the azo group; j stands for 0 or 1, k sands for 0 or 1, l stands for 0, 1 or 2; A represents a connecting group represented by the following formula (1c) or (1d):

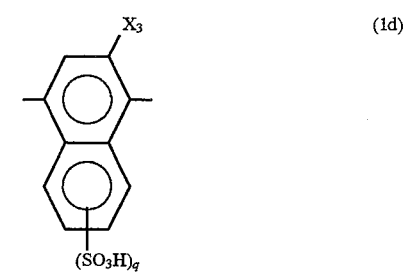

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1.

7. A polarizing film according to claim 6, wherein the polymer film is made of at least one material selected from the group consisting of polyvinyl alcohol, polyvinyl formal, polyvinyl acetal, polyvinyl butyryl, those obtained by modifying polyvinyl alcohol, polyvinyl formal, polyvinyl acetal and polyvinyl butyryl with ethylene, propylene, acrylic acid or acrylamide maleate, and a cellulose resin.

8. A process for the production of a polarizing film, which comprises dyeing a polymer film with a water-soluble dye and then stretching the dyed film at a draw ratio of 2 to 9 times, wherein said water-soluble dye comprises an azo compound represented by the following formula (1):

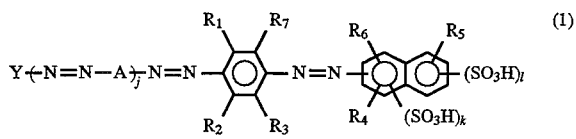

wherein Y represents a group represented by the following formula (1a) or (1b):

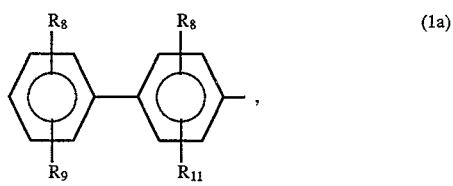

-continued

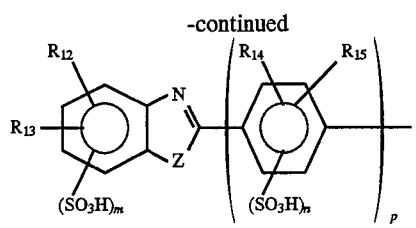 (1b)

wherein $R_8$ and $R_9$ each independently represents a hydrogen atom, a halogen atom, a methyl group, an ethyl group, a carboxyl group or a sulfonic acid group, $R_{10}$ and $R_{11}$ each independently represents a hydrogen atom, a halogen atom or a sulfonic acid group, $R_{12}$ and $R_{13}$ each independently represents a hydrogen atom, a halogen atom, a methyl group, an ethyl group, a methoxyl group, an ethoxyl group or a carboxyl group, $R_{14}$ and $R_{15}$ each independently represents a hydrogen atom, a halogen atom, a methyl group, an ethyl group, a methoxyl group, an ethoxyl group or a hydroxyl group, Z represents an oxygen atom, a sulfur atom or —NH— group, m stands for 0, 1 or 2, n stands for 0, 1 or 2; and p stands for 0, 1 or 2;

$R_1$ and $R_7$ each independently represents a hydrogen atom, a methyl group, an ethyl group, a methoxyl group, an ethoxyl group, a halogen atom or a hydroxyl group; $R_2$ and $R_3$ each independently represents a hydrogen atom, a methyl group, an ethyl group, a methoxyl group, an ethoxyl group, a halogen atom, an alkylcarbonylamino group or a hydroxyl group; $R_4$ represents a hydrogen atom, a carboxyl group, a methoxyl group, or an ethoxyl group; $R_5$ represents a hydrogen atom, a hydroxyl group, an amino group, a methylamino group, β-hydroxyethylamino group, acetylamino group, or a phenylamino or benzoylamino group in which the phenyl nucleus is unsubstituted or substituted by one or more nitro, amino, hydroxyl, methyl, ethyl, carboxyl and/or sulfonic acid groups and/or chlorine atoms; $R_6$ represents a hydroxyl or amino group substituted at the o- or p-position relative to the azo group; j stands for 0 or 1, k stands for 0 or 1, l stands for 0, 1 or 2; A represents a connecting group represented by the following formula (1c) or (1d):

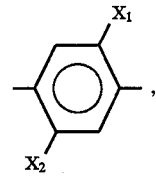 (1c)

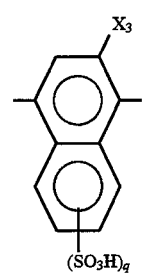 (1d)

wherein $X_1$ and $X_2$ each independently represents a hydrogen atom, a methyl group, an ethyl group, a methoxyl group, an ethoxyl group, a halogen atom, a hydroxyl group, an alkylcarbonylamino group or a sulfonic acid group; $X_3$ represents a hydrogen atom, a methoxyl group or an ethoxyl group; and q stands for 0 or 1.

* * * * *